Sept. 11, 1951     T. M. HUNT     2,567,337
SUCKER ROD FISHING TOOL
Original Filed May 24, 1940
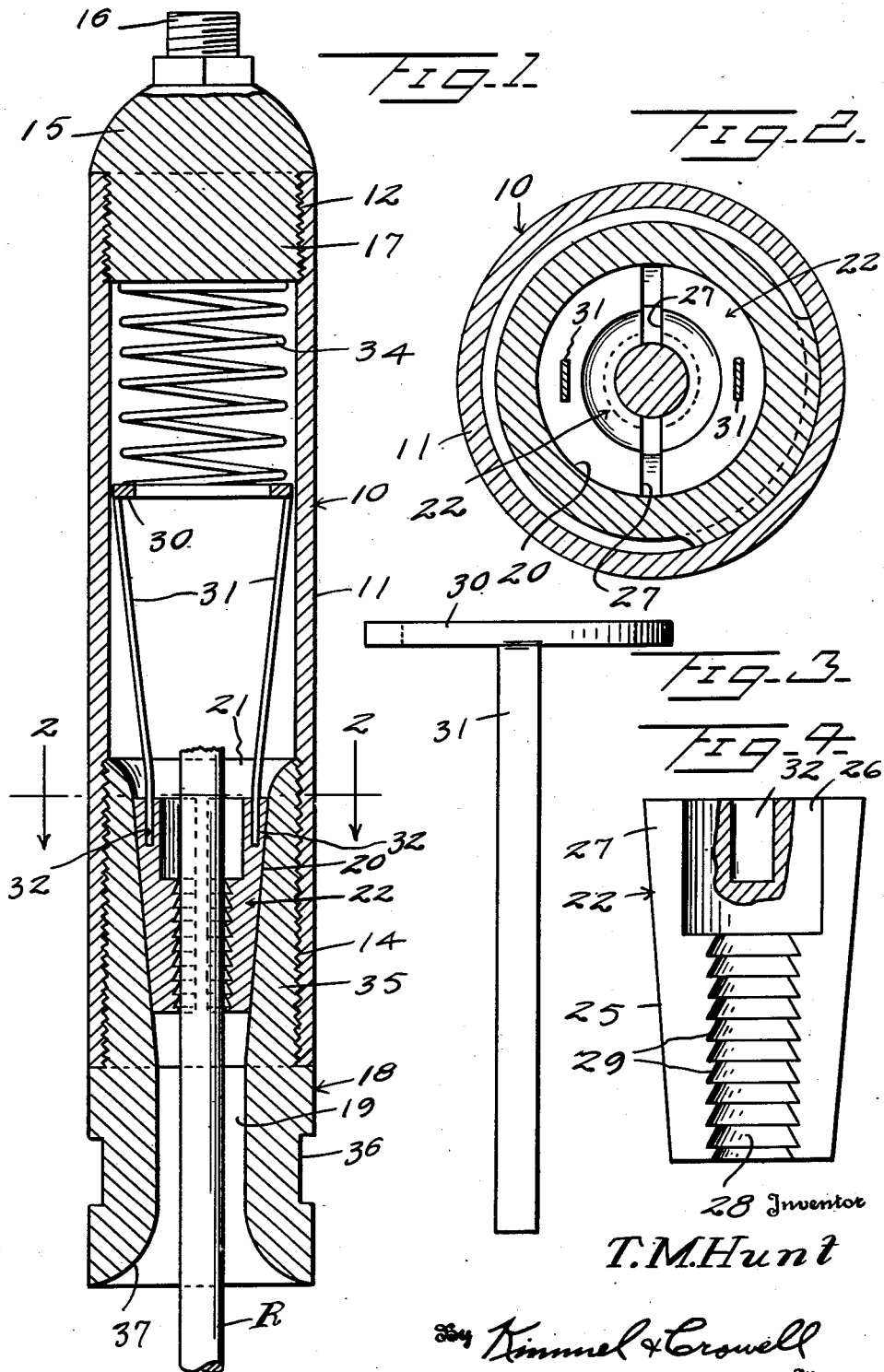
Inventor
T. M. Hunt
By Kimmel & Crowell
Attorneys Patented Sept. 11, 1951

2,567,337

UNITED STATES PATENT OFFICE 2,567,337

SUCKER ROD FISHING TOOL

Theodore M. Hunt, Tulsa, Okla.

Original application May 24, 1948, Serial No. 28,865. Divided and this application June 3, 1949, Serial No. 96,981

1 Claim. (Cl. 294—102)

This invention relates to a sucker rod fishing tool, and more particularly to an improved fishing tool of this kind for securely grasping broken sections of sucker rod so that these sections may be removed from the well tubing or casing.

It is an object of this invention to provide an improved sucker rod fishing tool of the kind to be hereinafter more particularly described having a socket for engagement about the free end of a broken sucker rod and gripping elements in the socket so constructed and arranged that increased weight or drag of the broken rod will increase the frictional engagement of the gripping elements with the rod.

It is a further object of this invention to so construct an improved fishing tool of this kind as to obtain the maximum strength while achieving inexpensive and simple manufacture and assembly resulting from the use of a minimum number of elements.

Another object of this invention is to provide a sucker rod fishing tool having an improved mounting for the gripping elements so as to permit maximum penetration of the free end of the broken sucker rod within the tool housing or body.

To the foregoing objects, and others which may hereinafter more fully appear, the invention consists of the novel construction, combination and arrangement of parts, as will be more specifically referred to and illustrated in the accompanying drawings, but it is understood that changes, variations, and modifications may be resorted to which fall within the scope of the invention as claimed.

In the drawings,

Figure 1 is a vertical section taken through a sucker rod fishing tool constructed according to an embodiment of my invention, Figure 2 is a transverse section taken on the line 2—2 of Figure 1, Figure 3 is a side elevation of the ring and jaw member supporting arms removed from the device; and Figure 4 is a side elevation, partly broken away and partly in section, of one of the jaw members removed from the assembly.

This application is a division of my copending application Serial No. 28,865 filed May 24, 1948, in which application a complete and full disclosure was made of the embodiment of my invention hereinafter described.

Referring to the drawings, the numeral 10 designates generally an improved sucker rod fishing tool or grapple for removing broken sections of sucker rod from a well drill pipe, tubing or casing. The sucker rod grapple 10 of this invention is designed for reaching deep into the well casings of the modern oil wells and the like and is particularly designed as an improvement over the grapples and fishing tools of this kind which have heretofore been used and which have proved unfit for use in these deep wells. The tool 10 is formed of high grade metal or other suitable material to incorporate the greatest strength in the smallest body.

The grapple tool 10 is formed with an elongated cylindrical body portion 11 which is open at both ends. The ends of the body 11 are threaded interiorly as shown by the numerals 12 and 14 of the drawings. At the upper end of the body 11 a cap 15 is provided for attaching the body to a suitable rod as 16 for lowering the tool 10 down into the tubing. The cap 15 is substantially hemispherical in configuration having a depending lug or bolt 17 thereon. The lug 17 is of a diameter less than the diameter of the center of the cap 15 so that the upper end of the body 11 when threadably engaged on the lug 17 will form a continuation at its outer surface of the outer surface and edges of the cap. A socket member as 18 is mounted on the lower end of the body 11 for clamping onto the free end of a broken section of sucker rod or the like.

The socket 18 is formed of an elongated cylindrical section of metal having a concentric opening as 19 extending through the length thereof. The opening 19 is formed with divergent upwardly extending inner walls as 20 which diverge toward the upper end of the socket member 18 from a point substantially at the center of the length of the socket. The inner walls 20 of the opening are smooth throughout their length and are arcuately flared at their extreme upper end as clearly shown in Figure 1 of the drawings and indicated by the numeral 21 in Figure 1.

A pair of segmental frusto-conical clamping jaw members 22 are supported within the socket 18 and engage in the passage 19 between the divergent walls 20 at the upper end of the socket. Each of the jaw members 22 are formed as a segment of a frusto-conical body which together complete this body and they are normally spaced apart by engagement with the sucker rod R clamped between them. The outer edges of the segmental bodies 22 converge downwardly at the same inclination as the walls 20 of the opening in the socket. The walls 25 of the jaw members smoothly engage along the length of the walls 20 in the socket to provide for the free sliding movement of the jaws therein. Each of the jaw members 22 is formed at its upper end with a portion of an upwardly opening cylindrical recess 26. The recess 26 extends downwardly a short distance from the upper end of the jaw member 22 and is provided for the disposition therein of extending portions of the sucker rod R when the jaw members are engaged with the rod. The jaw members 22 are formed with a flat surface as 27 which confronts the flat surface of the opposed jaw member contained within the socket 18. Both of the jaw members 22 are formed with a semi-cylindrical recess 28 extending downwardly from the recess 26 therein, the recess 28 being of a smaller diameter than the recess 26.

Jaw clamping teeth as 29 are formed on the inner surface of the recess 28 and are provided for clamping engagement with the sucker rod R. The teeth 29 are directed upwardly relative to the socket and the jaw members 22 so that the jaw members will be biased towards engagement with the sucker rod upon an exertion of force upwardly on the socket member when the sucker rod is clamped between the jaw members.

An annular ring as 30 is contained within the housing 11 between the cap 15 and the socket 18. The ring 30 is free to slide within the housing 11 and slidably engages the inner walls thereof. Depending arms as 31 are fixed to or otherwise formed on the ring 30 extending downwardly therefrom. The lower end of the arms 31 engages within an opening 32 formed in the jaw members 22. The opening 32 is open at the upper end of the jaw member 22 and extends downwardly into the body portion of the jaw member a short distance so that the lower end of one of the arms 31 may be contained therein. The lower end of the arms 31 may be suitably fixed in the opening 32 by frictional engagement therein, by welding or other suitable fastening devices. The arms 31 are substantially resilient and spring press the jaw members 22 to a normally divergent relation one to the other for the purposes to be described hereinafter.

A coil spring 34 is positioned between the lower end of the lug 17 and the ring 30 within the housing 11. The spring 34 constantly urges the ring 30 downwardly in the housing and the jaw members 22 downwardly in the socket member 18. The upper end of the socket 18 is reduced in diameter and threaded on the outer surface thereof for engagement with the lower threaded end 14 of the body 11. The threaded engagement of the reduced diameter end 35 of the socket 18 provides for the sole attaching means of the socket to the body.

The lower end of the socket 18 has an outer surface substantially flush with the outer surface of the body 11 to provide for the free sliding movement of the tool 10 within the well casing. The body portion of the socket 18 below the engagement of the reduced diameter upper end of the socket is formed with flats 36 which provide a nut surface about the socket for engagement with a suitable tool for securing the socket to the body 11. The lower end of the opening 19 within the socket is flared downwardly and outwardly as indicated by the numeral 37, to provide downwardly divergent interior walls terminating at the extreme lower end of the socket member 18. The downwardly divergent walls 37 provide a guide means for the sucker rod R as the tool 10 is lowered within the casing and comes into engagement with the upper broken end of one of the broken sections of the sucker rod.

In the use and operation of the sucker rod tool 10, the tool is lowered in a well casing for grappling for a broken section of the sucker rod. As the tool is lowered, the spring 34 presses the ring 30 downwardly thereby pressing the jaw members 22 downwardly in the socket toward the restricted end of the passage 20 where the flat surfaces 27 of the opposed jaw members will be in abutting engagement. The semi-circular teeth 29 carried by the jaw members 22 are concentric to the opening 19 in the socket and the teeth are parallel along the vertical axis of the socket.

As the tool 10 comes into engagement with the sucker rod section, the broken end of the rod will engage the upwardly converging guide walls 37 where the rod will be directed upwardly into the opening 19. The end of the rod will then engage the lower end of the jaw members 22 and slide the jaw members upwardly in the guide passage 20. Upward movement of the jaw members 22 will provide for the separation of the jaw members one from the other due to the lateral force exerted between them by the resilient arms 31. When the jaw members 22 are spaced apart one from the other a sufficient distance for the rod R to slide upwardly between them, the rod may be extended upwardly into the body 11 so that the broken end of the rod will be extended above the socket member 18. Thereafter, the tool 10 may be raised and the weight of the rod R, together with the downward force exerted by the spring 34, will effect the secure clamping of the upper end of the rod between the jaw members 22. The spring 34 and the downward force exerted on the jaw members by the weight of the rod R will bias the jaw members downwardly in the downwardly converging section 20 of the passage through the socket, thereby forcing the teeth 29 into secure engagement with the rod. The rod may then be withdrawn from the well casing throughout its entire length.

What I claim is:

An improved sucker rod fishing tool comprising a tubular sleeve of uniform internal and external diameter open at each end and having internal threads adjacent each end, a solid hemispherical cap member closing the upper end of said sleeve, a socket member having an externally threaded reduced diameter upper end engaging within the lower end of said sleeve, the lower end of said socket member being of the same external diameter of said sleeve, a bore extending through said socket member, said bore having an outwardly flared lower portion and an upwardly divergent upper portion, a pair of segmental frustro conical rod gripping members slidable in said upper portion of said bore, rod gripping teeth formed on the inner surface of said gripping members, an annular ring freely slidable in said body above said socket member and slidably engaging the side walls of said body, depending inwardly converging resilient arms integrally formed with said ring and engaging said gripping members for forcing the latter apart, and coiled spring means positioned between said cap and said ring and bearing directly against said ring for urging said ring and, hence, said gripping members downwardly in said sleeve.

THEODORE M. HUNT.

REFERENCES CITED

The following references are of record in the file of this patent:

UNITED STATES PATENTS

| Number | Name | Date |
| --- | --- | --- |
| 1,081,427 | Brummett et al. | Dec. 16, 1913 |
| 1,498,037 | Horton | June 17, 1924 |
| 1,546,179 | Nicholson et al. | July 14, 1925 |
| 2,094,419 | Shannon | Sept. 28, 1937 |